H. SWARTHOUT.
Churn Power.

No. 62,905.

Patented May 12, 1867.

Witnesses.
Seymour S. Scutt.
Ethan Jackson.

Inventor.
Henry Swarthout

UNITED STATES PATENT OFFICE.

HENRY SWARTHOUT, OF ALTAY, NEW YORK.

IMPROVEMENT IN CHURN POWER.

Specification forming part of Letters Patent No. 62,905, dated March 12, 1867.

*To all whom it may concern:*

Be it known that I, HENRY SWARTHOUT, of Altay, in the county of Schuyler, and State of New York, have invented a new and useful Improvement in Churn Powers; and I do hereby declare that the following is a full, clear, and exact description of the construction and operation of the same, reference being had to the annexed drawings, making a part of this specification, in which—

Figure 1:
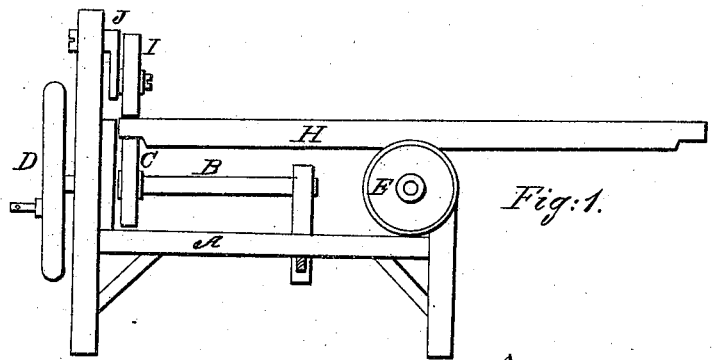

Figure 1 is a rear view.

Figure 2:
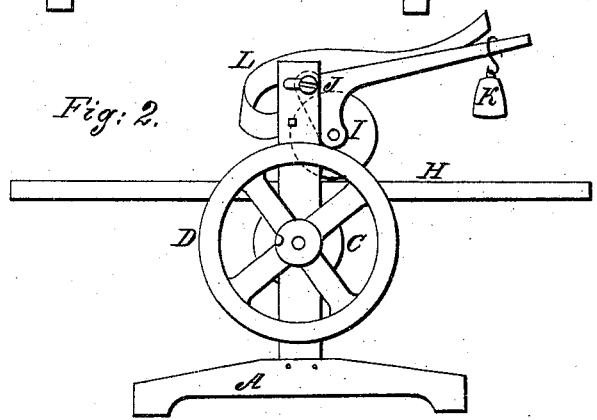

Figure 2, a transverse vertical section; and

Figure 3:
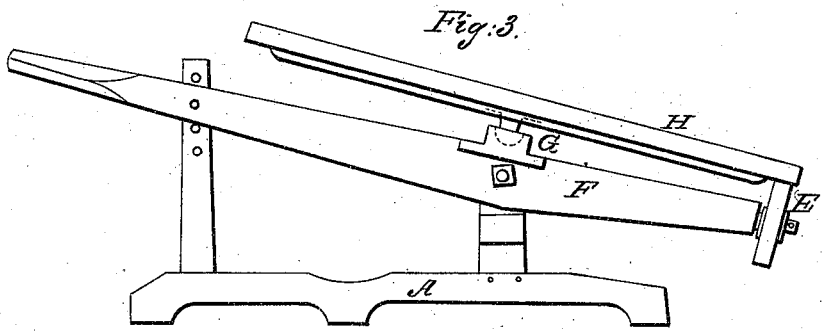

Figure 3, a longitudinal section of the driving-wheel and its supports.

The letters of reference refer to the same parts in each figure.

The nature of my invention consists in making a power or machine that may be propelled by any animal traveling upon the driving-wheel; and of changing the position of said wheel to make it more or less efficient; also, providing a weighted lever and roller to increase the adhesion of the driving-wheel to the roller underneath it, and having the parts adjustable for the amount of work to be done or power required.

To enable others skilled in the art to make and use my invention, I will proceed to describe its mode of construction and operation.

A is the frame; it is made of wood, in any strong and durable manner that will sustain the various parts of the machine. The plan represented in the drawings is preferable for general use, and can be readily made, and the size and proportions may be easily adapted to the various sizes required. B is a shaft or axle; it is held by one of the posts of the frame at one end; the other end is held by a post set in the timber that connects the parts, as shown in fig. 1. This axle sustains the roller C and the balance-wheel D. This axle should move with the least friction possible. C is a roller; it is securely fastened to the axle B; it is made plain and smooth on its periphery; it is used to sustain the wheel H, and transmit its power to the axle and balance-wheel, and thus to the churn; its position is shown in fig. 1. D is a balance-wheel, of any ordinary construction; it is securely fastened to the end of the axle B, as shown in figs. 1 and 2; it is provided with a crank-pivot to connect it to the churn in any method desired. E is a roller; it is pivoted on the end of the lever F, as shown in fig. 3; its use is for the wheel H to travel upon, and when its position is changed it changes the inclination of the wheel H. F is an adjustable lever; it is pivoted to one of the posts of the frame, as shown in fig. 3; it is held in any required position by a pin or bolt, as shown in fig. 3; its use is to change the inclination of the wheel H. G is a pivot-box; it is securely fastened to the upper surface of the lever F; its use is to receive the pivot that is in the centre and under side of the wheel H, and thus partly sustain the wheel and keep it in position. H is the driving-wheel, upon which the animal travels, and transmits power to perform the work required. It is provided with a pivot at its under centre, upon which it is partly sustained, and is held central and allowed to incline as desired. The inclination may be varied at will by means of the lever F, as above specified. This inclination of the wheel is varied for the purpose of having the animal transmit much or little power, as required. The inclination is different in figs. 2 and 3. The wheel also rests upon the rollers C and E; to the roller C it transmits its power by means of part of its own weight, the weight of the animal, and the power of the weight K, when applied as herein specified, and shown in figs. 1 and 2. I is an adjustable roller, placed upon the upper surface of the wheel H, and nearly over the roller C; it is pivoted to the lever J, as shown in figs. 1 and 2; its use is to hold the wheel H down upon the roller C. J is a lever, pivoted to the upper end of the post by a pivot that passes through a slot in the post, as shown in fig. 2. By means of the slot the position of the lever may be changed to suit the inclination of the wheel H. K is a weight that is suspended to the lever J, as shown in fig. 2. It may be increased or diminished, and moved to any point on the lever that is required to transmit the proper force to the roller I. L is a guard, fastened to the post, as shown in fig. 2. Its size or shape may be varied to suit the animal that is to tread the wheel H. Its use is to keep the animal in the proper place.

Having thus fully described my invention, what I claim as new, and desire to secure by Letters Patent, is—

1. I claim the arrangement of the roller E, lever F, and pivot-box C, when applied and used as specified, and for the purpose of changing the inclination of the wheel H, as set forth.

2. I claim the roller I, lever J, and weight K, when made and applied as and for the purpose herein specified.

HENRY SWARTHOUT.

Witnesses:
SEYMOUR S. SCOTT,
ELHAN JACKSON.